United States Patent
Warren

(10) Patent No.: US 10,554,432 B2
(45) Date of Patent: *Feb. 4, 2020

(54) HOME AUTOMATION VIA VOICE CONTROL

(71) Applicant: Vivint, Inc., Provo, UT (US)

(72) Inventor: Jeremy B. Warren, Draper, UT (US)

(73) Assignee: Vivint, Inc., Provo, UT (US)

(*) Notice: Subject to any disclaimer, the term of this patent is extended or adjusted under 35 U.S.C. 154(b) by 106 days.

This patent is subject to a terminal disclaimer.

(21) Appl. No.: 15/847,014

(22) Filed: Dec. 19, 2017

(65) Prior Publication Data

US 2018/0176031 A1 Jun. 21, 2018

Related U.S. Application Data

(63) Continuation of application No. 14/272,181, filed on May 7, 2014, now Pat. No. 9,860,076.

(51) Int. Cl.
| | | |
|---|---|---|
| *H04L 12/28* | (2006.01) |
| *G06N 99/00* | (2019.01) |
| *G05B 15/02* | (2006.01) |
| *G01L 15/00* | (2006.01) |
| *G06N 20/00* | (2019.01) |
| *G10L 15/00* | (2013.01) |

(52) U.S. Cl.
CPC .......... *H04L 12/2803* (2013.01); *G05B 15/02* (2013.01); *G06N 20/00* (2019.01); *G10L 15/00* (2013.01)

(58) Field of Classification Search
None
See application file for complete search history.

(56) References Cited

U.S. PATENT DOCUMENTS

| | | | |
|---|---|---|---|
| 6,249,575 B1 | 6/2001 | Heilmann et al. | |
| 6,535,854 B2 | 3/2003 | Buchner et al. | |
| 6,654,721 B2 * | 11/2003 | Handelman ............ | H04N 7/163 348/E7.061 |
| 7,552,467 B2 | 6/2009 | Lindsay | |

(Continued)

FOREIGN PATENT DOCUMENTS

| | | |
|---|---|---|
| EP | 2926502 B1 | 6/2016 |
| WO | 0039964 A1 | 7/2000 |

OTHER PUBLICATIONS

International Search Report and Written Opinion of the International Searching Authority for PCT/US2015/029663, dated Aug. 6, 2015.

(Continued)

*Primary Examiner* — Ramesh B Patel
(74) *Attorney, Agent, or Firm* — Holland & Hart, LLP

(57) ABSTRACT

Methods and systems are described for setting operation rules for use in controlling aspects of a home automation system. According to at least one embodiment, an apparatus for establishing operation rules in a home automation system includes a processor, a memory in electronic communication with the processor, and instructions stored in the memory which are executable by the processor to receive a spoken command having a plurality of rule setting terms, establish at least one operation rule for the home automation system based on the spoken command, and store the at least one operation rule for later use by the home automation system.

20 Claims, 10 Drawing Sheets

(56) References Cited

U.S. PATENT DOCUMENTS

| | | | |
|---|---|---|---|
| 8,042,048 B2 | 10/2011 | Wilson et al. | |
| 8,150,699 B2 | 4/2012 | Patch | |
| 8,340,975 B1 | 12/2012 | Rosenberger | |
| 8,538,757 B2 | 9/2013 | Patch | |
| 8,543,407 B1 | 9/2013 | Gagnon et al. | |
| 8,581,737 B2 | 11/2013 | Sharma et al. | |
| 8,654,936 B1* | 2/2014 | Eslambolchi | H04L 12/2818 379/88.04 |
| 9,368,107 B2 | 6/2016 | Hanson | |
| 9,715,875 B2* | 7/2017 | Piernot | G10L 15/22 |
| 9,860,076 B2* | 1/2018 | Warren | G06N 20/00 |
| 10,079,012 B2* | 9/2018 | Klimanis | G10L 15/065 |
| 2002/0052746 A1* | 5/2002 | Handelman | H04N 7/163 704/270 |
| 2002/0069063 A1 | 6/2002 | Buchner et al. | |
| 2002/0072905 A1 | 6/2002 | White et al. | |
| 2002/0171546 A1 | 11/2002 | Evans et al. | |
| 2003/0187659 A1 | 10/2003 | Cho et al. | |
| 2004/0003073 A1 | 1/2004 | Krzyzanowski et al. | |
| 2004/0010410 A1* | 1/2004 | Oh | G10L 15/22 704/246 |
| 2005/0081055 A1 | 4/2005 | Patrick et al. | |
| 2006/0181401 A1 | 8/2006 | Martin | |
| 2010/0127854 A1 | 5/2010 | Helvick et al. | |
| 2010/0184011 A1 | 7/2010 | Comerford et al. | |
| 2010/0191352 A1 | 7/2010 | Quail | |
| 2011/0062888 A1 | 3/2011 | Bondy et al. | |
| 2011/0208359 A1 | 8/2011 | Duchene et al. | |
| 2012/0109384 A1 | 5/2012 | Stepanian | |
| 2012/0173244 A1 | 7/2012 | Kwak et al. | |
| 2012/0253483 A1 | 10/2012 | Cavarec et al. | |
| 2012/0277889 A1 | 11/2012 | Bennett, III et al. | |
| 2013/0066635 A1 | 3/2013 | Kim et al. | |
| 2013/0183944 A1* | 7/2013 | Mozer | H04L 12/282 455/414.1 |
| 2013/0325484 A1 | 12/2013 | Chakladar et al. | |
| 2013/0328679 A1 | 12/2013 | Sennett et al. | |
| 2014/0156281 A1* | 6/2014 | Boyd | H04L 12/281 704/275 |
| 2014/0309789 A1* | 10/2014 | Ricci | B60Q 1/00 700/276 |
| 2014/0330435 A1 | 11/2014 | Stoner et al. | |
| 2014/0330560 A1* | 11/2014 | Venkatesha | G06F 21/32 704/235 |
| 2015/0162006 A1* | 6/2015 | Kummer | G07C 9/00571 704/275 |
| 2015/0162007 A1* | 6/2015 | Hwang | G06F 3/167 704/273 |
| 2015/0348548 A1* | 12/2015 | Piernot | G10L 15/22 704/235 |
| 2016/0314782 A1* | 10/2016 | Klimanis | G10L 15/065 |
| 2018/0012596 A1* | 1/2018 | Piernot | G10L 15/22 |

OTHER PUBLICATIONS

Supplementary European Search Report for EP Application No. 15789155.7, dated Sep. 4, 2017 (7 pp.).

Guo, et al., "Interactive Voice Controller Applied to Home Automation", Department of Computer and Communication, Kun Shan University, Taiwan, 2009, 4 pages.

Lemon, et al., "D2.3: Voice Programming of Devices and Services", Talk and Look: Tools for Ambient Linguistic Knowledge, Jan. 11, 2007, 43 pages.

Preda, et al., "Dynamic Deployment of Context-Aware Access Control Policies for Constrained Security Devices", IT Telecom Bretagne, Cesson-Sevigne, Nov. 3, 2011, pp. 1-44.

Reiff-Marganiec, et al., "Policy Architecture for Enhancing and Controlling Features", In Daniel Amyot and Luigi Logrippo editors, Proc. Feature Interactions in Telecommunication Networks VII, IOS Press, Amsterdam, Jun. 2003, 8 pages.

\* cited by examiner

HOME AUTOMATION VIA VOICE CONTROL

CROSS-REFERENCE TO RELATED APPLICATIONS

The present application is a continuation of U.S. patent application Ser. No. 14/272,181, now U.S. Pat. No. 9,860,076, filed May 7, 2014, titled "HOME AUTOMATION VIA VOICE CONTROL," and assigned to the assignee hereof, the disclosure of which is expressly incorporated herein in its entirety by this reference.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Advancements in mobile devices allow users to monitor and/or control an aspect of a home or business. As home automation and security products expand to encompass other systems and functionality in the home, challenges exist in setting rules for various automated functions of the home automation and security system.

SUMMARY

Methods and systems are described for setting operation rules that are used to control at least some functions of a home automation system. According to at least one embodiment, an apparatus for establishing operation rules in a home automation system includes a processor, a memory in electronic communication with the processor, and instructions stored in the memory which are executable by the processor to receive a spoken command having a plurality of rule setting terms, establish at least one operation rule for the home automation system based on the spoken command, and store the at least one operation rule for later use by the home automation system.

In one example, the instructions may be executable by the processor to initiate a rules mode for the home automation system prior to receiving the spoken command. The instructions may be executable by the processor to terminate the rules mode after establishing the at least one operation rule. Initiating the rules mode may include receiving a touch input at a control panel of the home automation system. Initiating the rules mode may include receiving a spoken trigger word or an audible sound. The instructions may be executable by the processor to deliver a request for clarification of the spoken command. The request for clarification may include an audible message. The request for clarification may include a displayed message visible on a control panel of the home automation system. The instructions may be executable by the processor to generate a message that includes a restatement of the spoken command and a request for confirmation of the correctness of the restatement of the spoken command. The instructions may be executable by the processor to generate a message to a user of the home automation system that includes a restatement of the at least one operation rule and requests confirmation of the accuracy of the at least one operation rule.

Another embodiment of the present disclosure relates to a computer-program product for establishing operation rules in a home automation system. The computer-program product includes a non-transitory computer-readable medium storing instructions executable by a processor to initiate a rule setting mode for the home automation system, receive a spoken command having a plurality of rule setting terms, generate at least one operation rule for the home automation system based on the spoken command, and generate a message that includes a restatement of the at least one operation rule.

In one example, at least some of the plurality of rule setting terms may be defined during installation of the home automation system at a property. At least some of the plurality of rule setting terms may be generic to a plurality of different home automation systems associated with a plurality of different properties. The plurality of rule setting terms may include at least one static term that is generic to a plurality of different home automation systems, and at least one dynamic term that is uniquely defined for the home automation system. The instructions may be executable by the processor to store the at least one operation rule for later use by the home automation system, wherein storing the at least one operation rule includes storing in a local database of the home automation system. The instructions may be executable by the processor to generate a message requesting confirmation of the spoken command. The instructions may be executable by the processor to receive confirmation of the spoken command.

A further embodiment of the present disclosure relates to a computer-implemented method for establishing operation rules in a home automation system. The method includes initiating a rules mode for the home automation system, receiving a spoken command having a plurality of rule setting terms, establishing at least one operation rule for the home automation system using the spoken command, storing the at least one operation rule, and operating at least one function of the home automation system based on the at least one stored operation rule.

In one example, the plurality of rule setting terms may include at least one static term that is pre-programmed into the home automation system prior to installation. The plurality of rule setting terms may include at least one dynamic term that is uniquely programmed into the home automation system no sooner than installation at a property.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
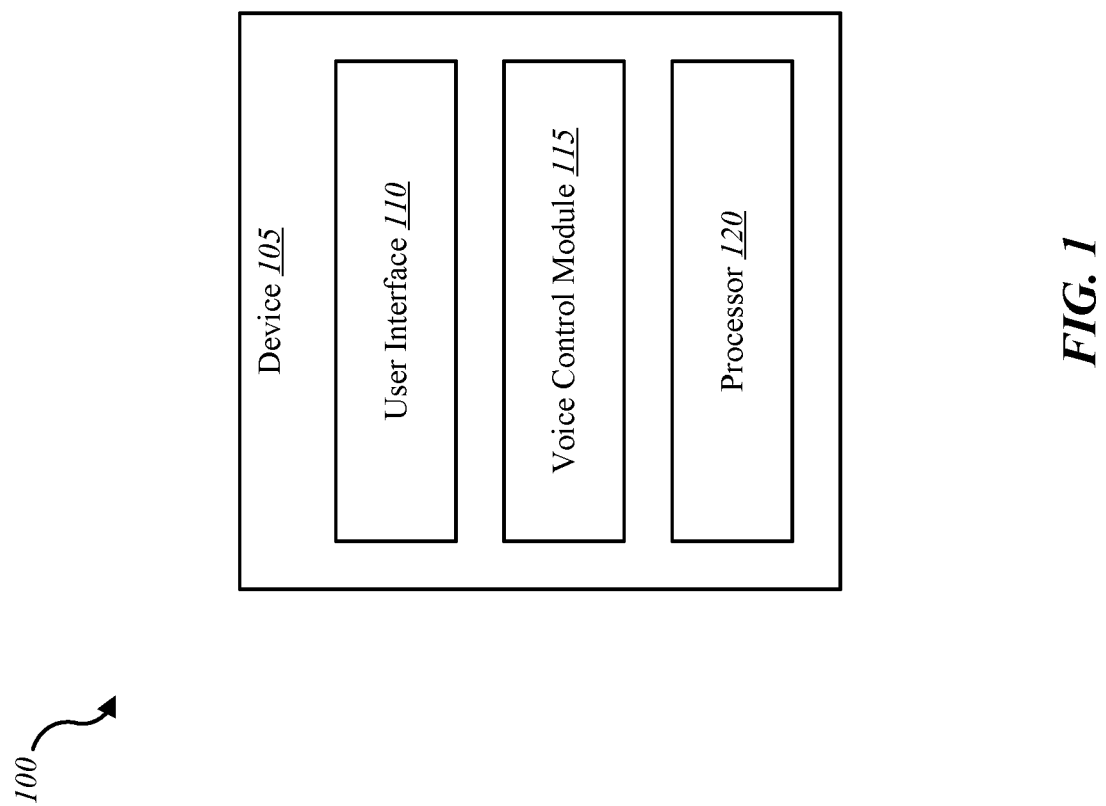
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security, and related security systems and automation for use in commercial and business settings. More specifically, the systems and methods described herein relate to operating features of a home automation system using voice control. As used herein, the phrase "home automation system" may refer to a system that includes automation features alone, security features alone, a combination of automation and security features, or a combination of automation, security and other features. While the phrase "home automation system" is used throughout to describe a system or components of a system or environment in which aspects of the present disclosure are described, such an automation system and its related features (whether automation and/or security features) may be generally applicable to other properties such as businesses and commercial properties as well as systems that are used in indoor and outdoor settings.

Home automation systems are typically programmed via an on-site control panel that is located at the property that is being monitored/controlled by the system. The control panel usually includes a touch screen with a number of categories and menus to select from for programming various functions of the system. The user-selected options create rules by which the system operates/functions. For example, the system may be programmed by selecting among the options presented on the control panel screen to arm or disarm the system at a certain time of the day or day of the week based on the programmed rules. Once the "rules" are established, the system operates automatically when the time of day or day of week condition is met.

Home automation systems are initially programmed for a particular property by a professional installer who is familiar with the control panel and how to program and/or modify functionality of the system. The property owner is usually less familiar with the control panel and how to modify functionality of the system after it is installed. Opportunities exist for improving the user interface with a home automation system, and particularly the process by which the operation rules of the system are established and/or modified.

One aspect of the present disclosure relates to using voice control with a home automation system. The voice control may particularly relate to establishing or changing rules by which the automation system operates, rather than prompting functionality of the automation system. Real-time control of at least some functionality of an automation system (speaking a command to arm the system or unlock a door) is relatively well-known in this technical field. The present disclosure is intended to alleviate challenges for a user in interfacing with the home automation system (e.g., control panel) to establish or modify the rules by which the home automation system operates. The voice commands given in accordance with the present disclosure typically do not result in real-time change in functionality of the system, but rather are used at a later time to control functionality of the system.

In one example, a user may first activate a "rules" mode for the home automation system and then speak a command such as "unlock back door every day at 7:00 a.m." or "turn up basement thermostat to 75 degrees when Jason arrives home after noon." The "rules" mode may be activated by speaking a trigger word or phrase (e.g., "rules mode"), selecting a rules button or category on the control panel (e.g., on a display screen of the control panel), or entering a key word at the control panel.

The command may include static and/or dynamic vocabulary that is interpreted in order for the system to understand the meaning of the command. Static vocabulary may include those terms that are consistent for at least a certain type of home automation system (e.g., unlock, every, day, 7:00, a.m., turn up, after, noon, 75 degrees, etc.). The system may include a library of static vocabulary and definitions associated with each term. Dynamic vocabulary may include those terms that are specific to a particular property and system setup. For example, the various access points of a building may be named according to user preferences at the time of system setup (e.g., back patio door, basement thermostat, etc.). The dynamic terms may be, for example, stored separately, defined at the time of set up, and/or modified during the lifetime of the system. The dynamic vocabulary may also include the names or identifiers of persons who are authorized to access the property (e.g., Jason, mom, etc.). The persons may be identified by the system in a variety of ways, including cell phones and fabs carried by the persons, codes entered by the persons when entering or leaving the property, voice or face recognition, etc.

The system may be configured to prompt the user for clarification of the spoken command if the command includes one or more unknown terms or is unclear in some way. The prompt may be an audible message (e.g., a spoken message such as, "you mentioned back door, is this the south back door or the east back door?") or displayed (e.g., on a screen of a control panel or on a mobile handheld device). The system may also repeat the rule back to the user and request confirmation of its correctness before storing and/or using the rule to control functionality of the system.

As mentioned above, the rule setting mode for the home automation system may be operated through a control panel of the home automation system. Additionally, or alternatively, the rule setting mode may be operated via a remote computing device, such as a mobile handheld device, laptop computer, desktop computer, mobile tablet computing device, or the like. Any function related to setting rules of the home automation system, such as the voice control features discussed herein for setting rules of the home automation system, may be performed using such a remote computing device.

FIG. 1 is a block diagram of one example of an environment 100 in which the present systems and methods may be implemented. In some embodiments, the systems and methods described herein may be performed, at least in part, using a device 105, which includes a user interface 110, a voice control module 115, and a processor 120.

Environment 100 may include or be a part of a home automation system. Device 105 may include or be part of a control panel of a home automation system. Device 105 may be a permanently installed device (e.g., a control panel mounted to a wall of a building) or it may be a mobile device such as, for example, a desktop computer, a laptop computer, a tablet computer, or mobile handheld device such as a smartphone. Device 105 may operate at least in part to establish rules of operation for a home automation system. As mentioned above, rules are typically established for a home automation system using a somewhat complicated and oftentimes non-user friendly system of drop down menus, questions, and the like that a user must navigate via, for example, a display on a control panel. A potential advantage related to the voice control features of the present disclosure for setting rules for a home automation system is the reduced complexity of creating rules and being able to avoid at least some of the confusing, complex menus and interfaces that are otherwise required to establish such rules.

User interface 110 may provide a physical interface between device 105 and a user. User interface 110 may include, for example, a touch screen with a plurality of user activated menus and screen selectable features. User interface 110 may include one or more physical buttons, switches, or the like. User interface 110 may include at least one feature that provides a user the ability to enter into or exit a rule setting mode for the home automation system. User interface 110 may include other features or functionality that permit the user to select certain rules and/or responses to questions as part of setting rules related to a home automation system.

Voice control module 115 may operate at least in part in response to audible sounds and to establish one or more rules for the home automation system in response to the audible sounds. The audible sounds may be voice commands generated by one or more users. Additionally, or alternatively, the audible sounds may include tones, notes, beeps, or other sounds that are generated by a device and/or by the user.

Voice control module 115 may provide an interactive experience with a user to establish a rule for a home automation system. For example, voice control module 115 may receive a voice command from a user which places the home automation system in a rule setting mode. Once in the rule setting mode, voice control module 115 may prompt the user for information related to setting one or more rules. Voice control module 115 may receive audible responses and/or inputs via, for example, user interface 110, from the user to create a rule. Voice control module 115 may respond to the user with audible and/or displayed responses for the purpose of, for example, confirming instructions from the user related to the rule being established, requesting clarification of the inputs from the user related to setting a rule, or confirming that the rule has been established. The functionality provided by voice control module 115 may eliminate, at least in part, the need for a user to provide inputs via, for example, user interface 110 or other physical inputs from the user in order to establish a rule for the home automation system. In at least some embodiments, voice control module 115 may be operable to establish at least one rule of the home automation system using only audible impact from the user.

Processor 120 may cooperate with user interface 110 and voice control module 115 to perform any of the computing and/or logic functions related to, for example, inputting information from the user, establishing rules, storing rules, and later providing at least some automated function of the home automation system based on the rules.

Typically, the rules established by voice control module 115 are stored and used for future operation of one or more features of the home automation system. Rules may be stored in any of a number of locations including, for example, a memory or database of device 105. In other examples, the rules may be stored at other locations such as, for example, in a cloud storage or in a backend server available via, for example, a network. Once saved, the rules may provide for automated functionality of home automation system based on certain conditions. For example, a rule established via voice control module 115 may be that the "front door is locked every time Bill arms the system." The home automation system may be able to identify the difference between Bill and other users of the system based on, for example, a log-in/security code, voice recognition, a pre-registered mobile device that is identifiable via, for example, blue tooth technology, or the like. Bill may arm the system in any of a number of ways including, for example, manual arming the system via user interface 110 or other feature or device 105, arming the system via a remote computing device (e.g., a mobile handheld device), or using a voice command of "arm system" spoken from anywhere in the property and picked up by any number of microphones or other features of the home automation system.

The spoken commands received from the user at voice control module 115 may include a variety of different terms. Some of the terms may be classified as "static" terms that are generic to all of at least a certain type of home automation systems. The generic terms may include such words as, for example, lock, unlock, arm, disarm, on, off, open, close, daytime, night, 1:00, noon, I, me, arrive, depart, temperature, raise, lower, and the like.

Other types of terms may be classified as "dynamic" terms that are unique to a specific property or particular home automation system installation. The names of each of the people living in the home or others who may be authorized to operate the home automation system may be stored in a dynamic term database. Other dynamic terms may include, for example, particular names assigned to each of the barriers, appliances, systems, or areas of the home (e.g., front door, south garage door, kitchen light, patio window, south HVAC zone, front sprinkler zone, and the like). The dynamic terms may be established at the time of, for example, installing the home automation system, as prompted at any time via, for example, voice control module 115, or based on a questionnaire that is answerable, for example, when updating or upgrading the home automation system. The static and dynamic terms may be stored in different locations. The static terms may be pre-programmed in the home automation system. In at least some examples, the static terms may be permanent and unable to be altered. In contrast, the dynamic terms may be updated, added to, or changed as desired.

Voice control module 115 may search the static and dynamic term databases in response to receiving a voice command from a user to determine whether the voice command provides enough specificity to generate a rule. If there is uncertainty and/or a lack of clarity related to any of the static or dynamic terms identified in the spoken command, voice control module 115 may prompt the user to, for example, restate the voice command, restate a specific term, provide clarification of a given term, or confirm that the spoken command (as repeated back to the user via voice control module 115) accurately reflects the user's intended instructions and/or rule.

Figure 2:
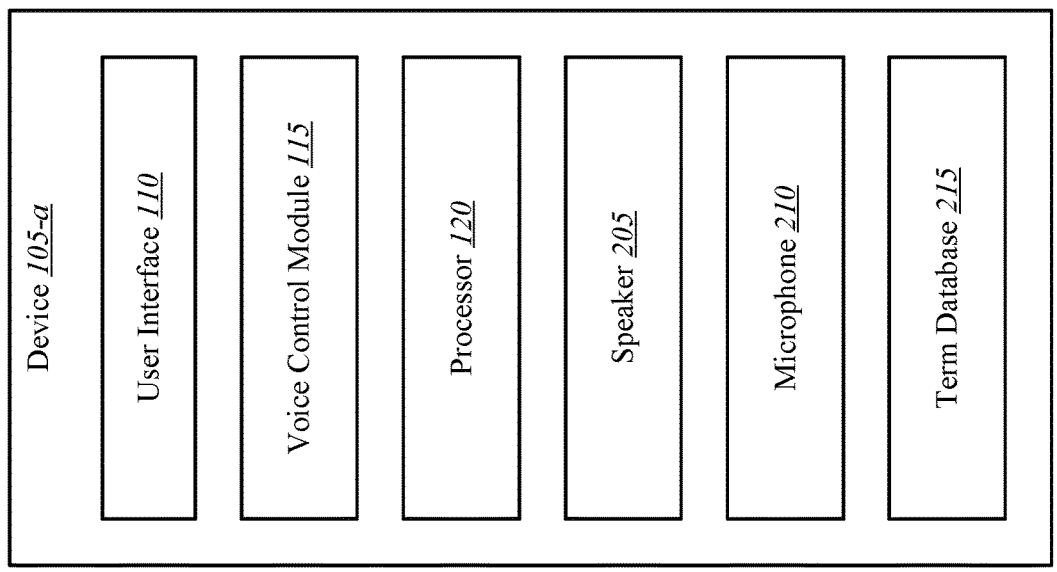
FIG. 2 is a block diagram of another environment in which the present systems and methods may be implemented.

FIG. 2 shows another environment 200 that may include the components in environment 100 described above, and may further include a device 105-a having a user interface 110, a voice control module 115, a processor 120, a speaker 205, a microphone 210, and a term database 215. The speaker 205 and microphone 210 may facilitate audible communication between the user and the home automation system (e.g., voice control module 115). Speaker 205 may convey audible responses from the home automation system to the user. Microphone 210 may operate to receive audible signals from the user (e.g., voice commands). Speaker 205 and microphone 210 may be integrated into device 105-a. In other examples, speaker 205 and/or microphone 210 may be provided as separate components from device 105-a. Furthermore, speaker 205 and microphone 210 may provide multiple functions, some of which may be unrelated to establishing rules for the home automation system. For examples, speaker 205 may be used to convey alarm signals, messages to the user related to the status of one or more barriers at the home, convey audible messages related to, for example, current weather conditions or the status of an HVAC system, or prompt the user for further instructions related to operation of the home automation system. Microphone 210 may operate to receive audible signals from a user including, for example, instructions related to operation of security features and/or automation features for real-time control of the home automation system.

Term database 215 may include at least one storage location for storing one or more static and/or dynamic terms. Term database 215 may be part of or include memory capability for device 105-a. In one example, device 105-a may include a storage device (e.g., hard disk drive or solid state drive) that includes a portion thereof dedicating to storing terms (e.g., the term database 215). In other examples, term database 215 may be a separate and distinct storage device and/or storage location, and may include storage at a remote location. Term database 215 may be provided as a component of home automation system that is separate from device 105-a. Term database 215 may be accessible via, for example, a network. Term database 215 may include separate storage devices for static terms versus dynamic terms.

Figure 3:
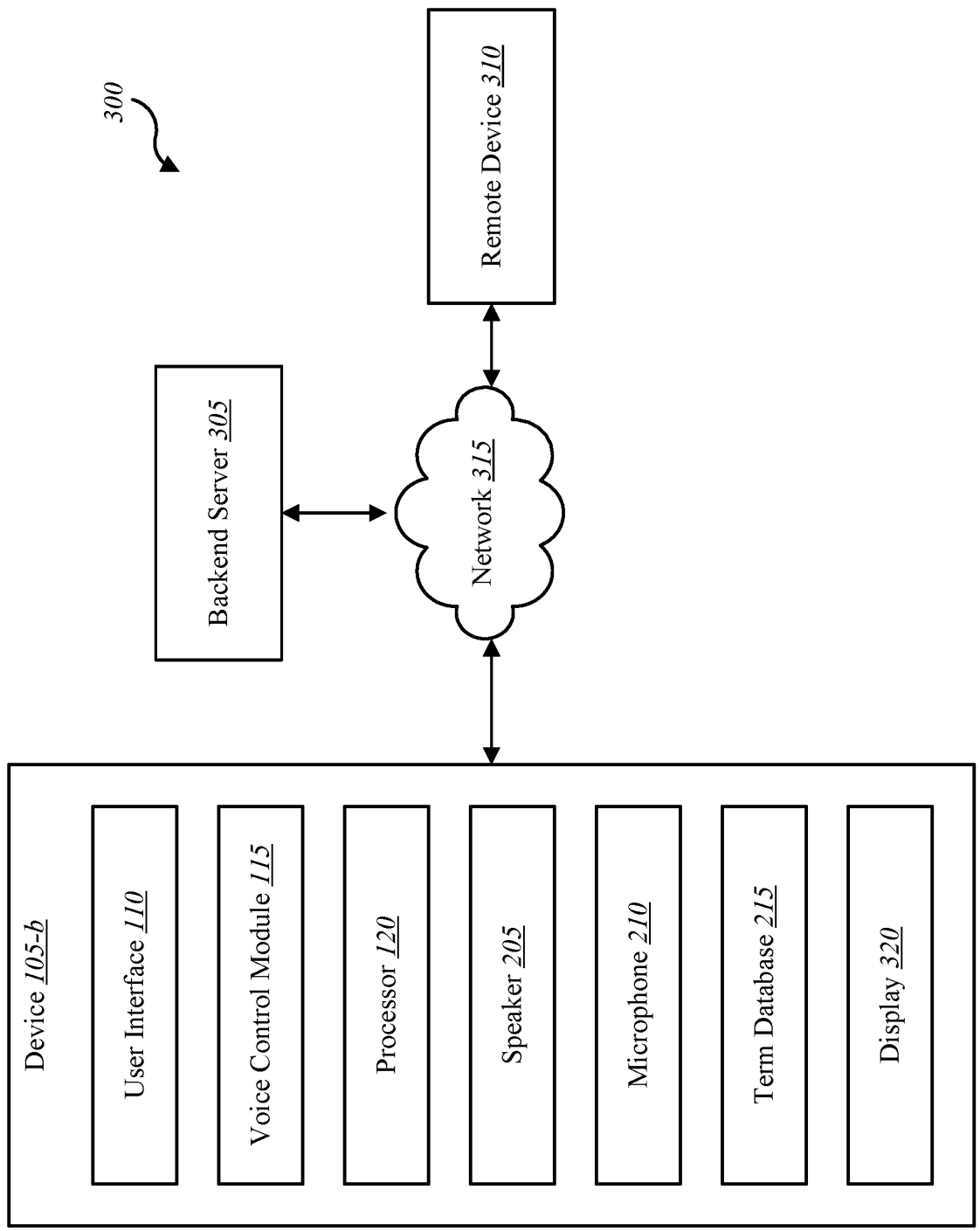
FIG. 3 is a block diagram of another environment in which the present systems and methods may be implemented.

FIG. 3 shows another environment 300 that may include the components of environments 100, 200 described above, and may further include a backend server 305, a remote device 310, and a network 315. Additionally, a device 105-b may include, in addition to the components of device 105-a shown in FIG. 2, a display 320.

Backend server 305 may provide at least some backend support, functionality, and/or storage for a home automation system that includes device 105-a. In one example, at least some of the static and/or dynamic terms associated with term database 215 may be stored at the backend server 305. Backend server 305 may provide support services such as, for example, communicating with emergency personnel in response to an alarm condition identified by device 105-b. In other examples, at least some of the rules established via operation of voice control module 115 may be stored in backend server 305.

Remote device 310 may provide operation of at least some features of the home automation system from a remote location. For example, remote device 310 may facilitate communication between a user of the home automation system and voice control module 115. Remote device 310 may include, for example, a speaker and/or microphone to provide voice commands used to establish rules via voice control module 115. Voice control module 115 may generate audible responses and/or displayed responses that are communicated to the user via remote device 310. For example, remote device 310 may be operated by the user to initiate a rule setting mode via voice control module 115. Once the rule setting mode is initiated, the user may provide one or more voice commands via remote device 310 that are used to establish one or more rules of the home automation system. Voice control module 115 may provide a response to the spoken commands, wherein the responses received at the remote device 310 are in some other way communicated to the user. Once the rules are established voice control module 115, the rules may be stored and used to operate the home automation system at a later time.

Network 315 may provide communication between device 105-b, backend server 305, and remote device 310, or other components of environment 300. Network 315 may include local area networks (LAN), wide area networks (WAN), virtual private networks (VPN), wireless networks (using 802.11, for example), and/or cellular networks (using 3G and/or LTE, for example), etc. In some embodiments, network 315 may include the internet.

Environment 300 shows display 320 as a component of device 105-b. In other examples, display 320 may be provided as a separate component from device 105-b. Display 320 and other features or components of device 105-b may be provided separate from device 105-b and communicate with each other via, for example, network 315. Voice control module 115 may communicate information via display 320 to a user during, for example, a rule setting mode of the home automation system. Display 320 may be part of user interface 110. Display 320 may include, for example, a touch screen. Display 320 may display colors, patterns, and the like, as well as text and other symbols. In one example, display 320 displays a text message such as "please restate previous voice command," "I heard you say to lock the door every time Bill arms the system, is that correct," or "you said back door, do you mean back patio door or back bedroom door." In at least some examples, voice control module 115 may provide a text message via display 320 as well as an audible message via speaker 205. The text and audible messages may be selected depending on, for example, considerations such as whether the user setting the rules is in close proximity to device 105-b, whether the user is able to read, etc.

Figure 4:
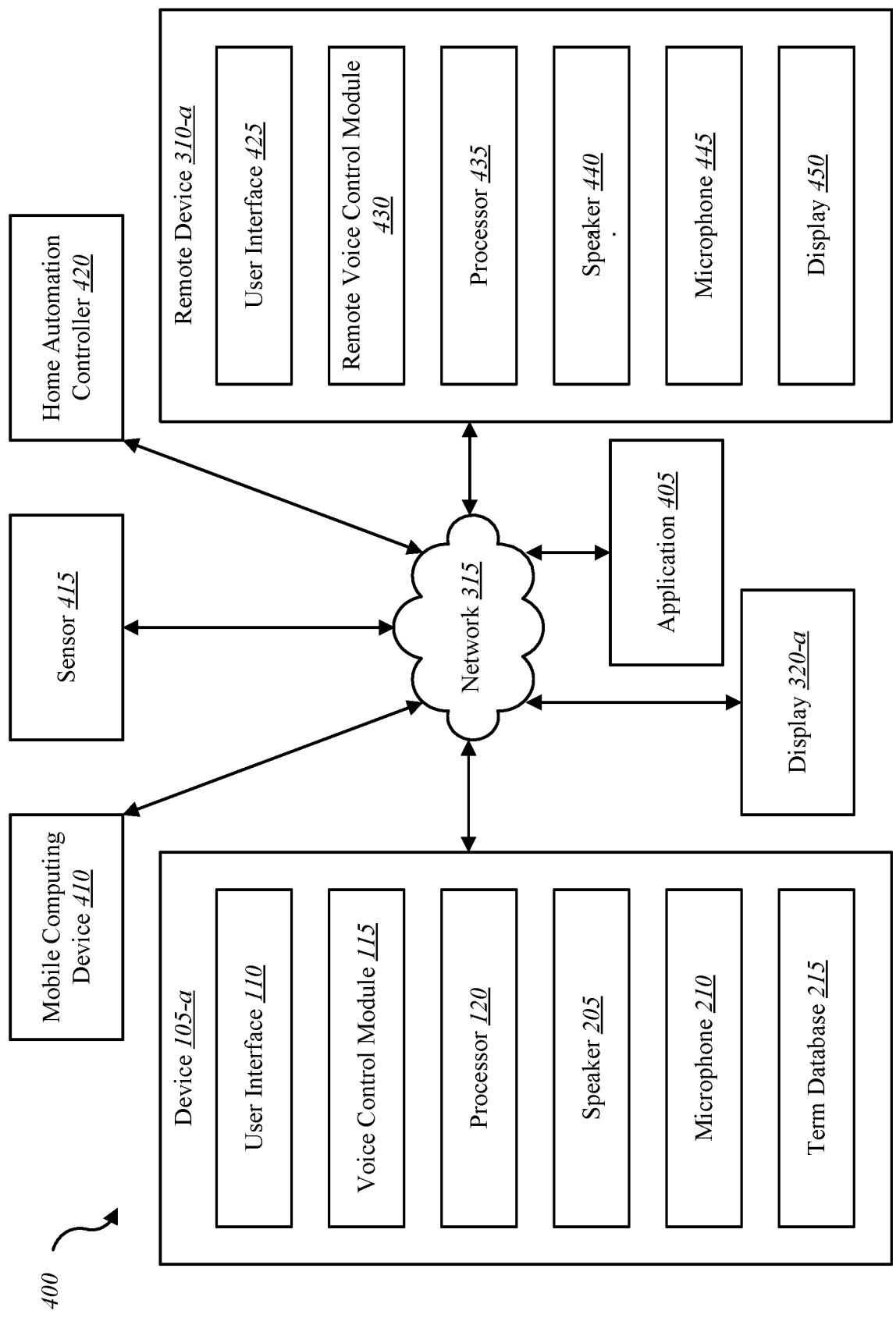
FIG. 4 is a block diagram of another environment in which the present systems and methods may be implemented.

FIG. 4 shows another environment 400 that may include the components of any of the environments 100, 200, 300 described above, and may further include an application 405, a mobile computing device 410, a sensor 415, a home automation controller 420, and a remote device 310-a. Remote device 310-a includes a user interface 425, a remote voice control module 430, a processor 435, a speaker 440, a microphone 445, and a display 450. Environment 400 may also include a display 320-a that is separate from device 105-a. Device 105-a, which may include the same or similar components as shown in FIG. 2, may communicate with the other components and features of environment 100 via network 315.

Application 405 may allow a user to control either directly or via device 105-a or a remote device 310-a, an aspect of the monitored property, including security, energy management, locking and unlocking doors, checking the status of a door, locating a user or item, controlling lighting, thermostat, or cameras, and retrieving notifications regarding a current status or anomaly associated with a home, office, place of business, and the like. In some configurations, application 405 may enable device 105-a and/or remove device 310-a to interface with voice control module 115, processor 120, or the like and provide the user interface 110 to display an automation kind of security and/or energy management content on device 105-a and/or remote device 310-a. Thus, application 405 via user interface 110, or other features of environment 400 may allow users to control aspects of their home, office and/or other type of property. Further, application 405 may be installed on device 105-a, remote device 310-a, or other components of environment 400. Application 405 may operate in response to at least one rule established via voice control module 115.

Display 320-a may include, for example, a digital display as part of, for example, a control panel of environment 400 (e.g., a home automation system). Display 320-a may be provided via devices such as, for example, a desktop computer or a mobile computing device (e.g., remote device 310-a). The user interface 110 may be integrated into display 320-a. Such a user interface 110 may include a plurality of menus, screens, microphones, speakers, cameras, and other capability that permit interaction between the user and the home automation system or other components of environment 400. Additionally, or alternatively, user interface 110 with display 320-a may be integrated into device 105-a as discussed above related to environment 300.

Mobile computing device 410 may include remote device 310-a or be part of remote device 310-a. Mobile computing device 410 may be used to interact with voice control module 115 from a local or remote location. For example, mobile computing device 410 may provide initiation of a rule setting mode, may communicate a voice command associated with establishing a rule via voice control module 115, and the like from any location relative to device 105-a.

Sensor 415 may include, for example, a camera sensor, an audio sensors, a forced entry sensor, a shock sensor, a proximity sensor, a boundary sensor, an appliance sensor, a light fixture sensor, a temperature sensor, a light beam sensor, a three-dimensional (3D) sensor, a motion sensor, a smoke sensor, a glass break sensor, a door sensor, a video sensor, a carbon monoxide sensor, an accelerometer, a global positioning system (GPS) sensor, a Wi-Fi positioning sensor, a capacity sensor, a radio frequency sensor, a near-field sensor, a heartbeat sensor, a breathing sensor, an oxygen sensor, a carbon dioxide sensor, a brain wave sensor, a motion sensor, a voice sensor, a touch sensor, and the like. The device 105-a, application 405, display 320-a, remote device 310-a, home automation controller 420, or other components of environment 400 and/or a home automation system may have included or have integrated therein one or more of the sensors 415. Although sensor 415 is depicted as a separate component from device 105-a, remote device 310-a, and other components of environment 400. In some embodiments, sensor 415 may be connected directly to any one of these components or other components of environment 400. Additionally, or alternatively, sensor 415 may be integrated into a home appliance or fixture such as a light fixture. The information provided by sensor 415 may be used to initiate a rule setting mode of a home automation system, confirm user feedback associated with questions or other feedback provided via voice control module 115, confirm identification of one or more users attempting to establish or change rules of the home automation system, and the like. In other examples, sensor 415 may operate in response to the rule established via voice control module 115 (e.g., rules established by voice commands, stored, and then used by the home automation system at a later time to permit one or more feature and/or functionality of the home automation system).

Home automation controller 420 may include or be part of processor 120 and/or processor 435. Home automation controller 420 may operate to control any of the features or functionality of a home automation system and/or component of environment 400. Home automation controller may operate at least in part in response to rules established via voice control module 115.

Remote device 310-a may include at least some of the features and/or functionality of device 105-a, and may provide such functionality from a location that is remote from device 105-a and/or a property being controlled and/or monitored by a home automation system. The user interface 425 may include any of the features and/or functionality of user interface 110. Remote voice control module 430 may include at least some of the features and/or functionality of voice control module 115 described above. Likewise, processor 435, speaker 440, microphone 445, and display 450 may include at least some of the same features and/or functionality of the processor 120, speaker 205, microphone 210, and display 320-a, respectively described above with reference to device 105. For example, remote voice control module 430 may facilitate initiation of a rule setting mode for the home automation system via remote device 310-a. Remote voice control module 430 may operate to receive voice commands and other input related to establishing one or more rules, and may provide communication and/or responses to the user as part of establishing the rules. Speaker 440 and microphone 445 may operate to communicate between the user and the home automation system. Speaker 440 and microphone 445 may also provide communication between a user operating remote device 310-*a* and the voice control module 115 of device 105-*a* (e.g., via network 315). Furthermore, display 450 may display messages to the user operating remote device 310-*a* in response to operation of voice control module 115.

In at least some respects, remote device 310-*a* may provide a user with the ability to generate and/or change rules for operation of the home automation system while the user is positioned at a location remote from device 105-*a* (which may be any location remote from a property being monitored by the home automation system). In other examples, remote device 310-*a* may provide communication between voice control module 115, which operates on device 105-*a* locally at the property being monitored by the home automation system, while the user is positioned at a location remote from the property.

Figure 5:
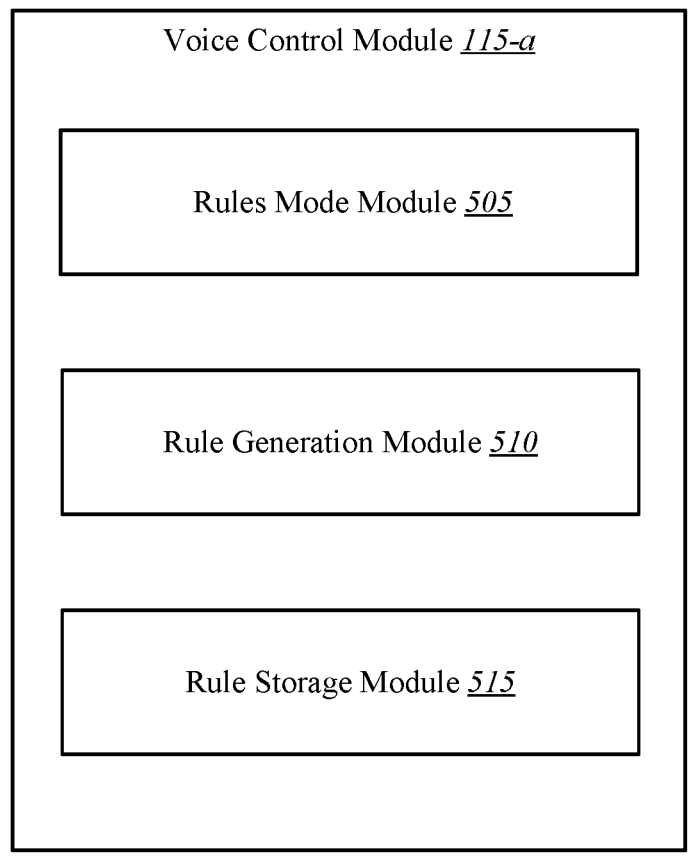
FIG. 5 is a block diagram of a voice control module for use in at least one of the environments shown in FIGS. 1-4.

FIG. 5 shows a voice control module 115-*a* that may be one example of the voice control modules 115 shown and described with reference to FIGS. 1-4. Voice control module 115-*a* may include a rules mode module 505, a rule generation module 510, and a rule storage module 515. In other embodiments, voice control module 115-*a* may include other modules that perform the same or different functionality for the voice control module 115.

Rules mode module 505 may operate to place the home automation system in a rule setting mode. The rules setting mode may be initiated by, for example, the user speaking a voice command that includes a particular trigger word/phrase such as, for example, "start rules mode," "set new rule," or "change a rule." In another example, the rule setting mode is initiated by the user providing manual input such as, for example, touching an active area of a touch screen, pressing a button, operating a switch, etc. (e.g., via user interface 110 or user interface 425).

Rules mode module 505 may provide feedback to the user to confirm that the home automation system is in a rule setting mode. Rules mode module 505 may provide an indicator such as, for example, an audible message that states "rule setting mode active," a text message displayed to the user that reads "rules mode," a symbol, a change in color of a light indicator, etc. In another example, rules mode module 505 may prompt the user for instructions as a way to confirm that the home automation system is in a rule setting mode. For example, the rules mode module 505 may provide an audible or text message stating "provide rules instructions" or "enter rule."

Rule generation module 510 may receive the rules instructions from the user and generate at least one rule for the home automation system in response to the received instructions. Rule generation module 510 may operate to provide communication back to the user in response to instructions received from the user. The responsive communication may be in any format. For example, the user may provide audible instructions related to setting a rule (e.g., "lock the front door every time Bill arms the system"), and rule generation module 510 provides a confirmation of the instructions to the user via audible, text, or other means of communication with a message such as "you stated, lock the door every time Bill arms the system, is this correct?" Rule generation module 510 may also confirm that a rule has been set by communicating a message to the user such as, for example, "rule set" or "created new rule."

Rule storage module 515 may store the rule for later use by the home automation system. Rule storage module 515 may provide instructions for saving the rule in any of a number of locations such as, for example, the memory of a storage panel (e.g., device 105), or at a remote location such as, for example, backend server 305. Rule storage module 515 may also operate to retrieve the rule and/or permit the user to modify and/or replace a rule at a later time.

Figure 6:
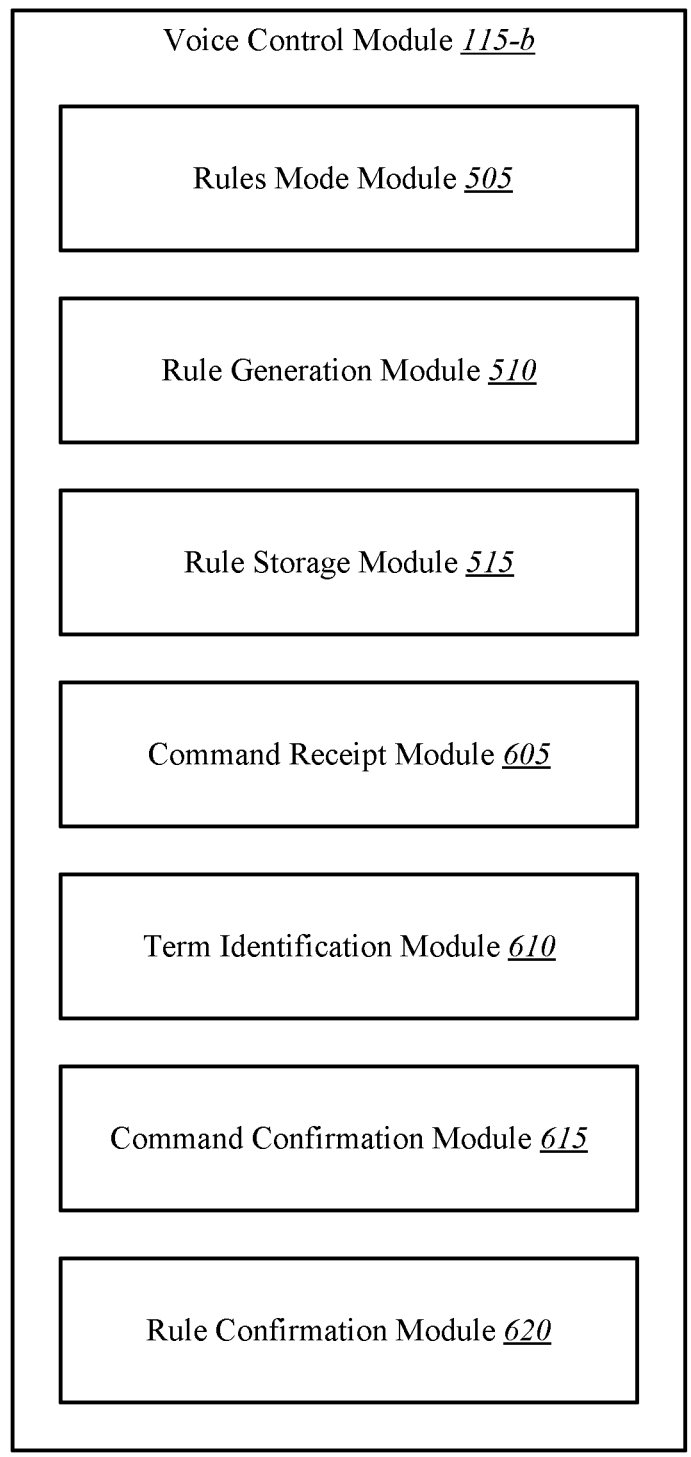
FIG. 6 is a block diagram of another voice control module for use in at least one of the environments shown in FIGS. 1-4.

FIG. 6 is a block diagram illustrating another voice control module 115-*b*. Voice control module 115-*b* may be one example of the voice control module 115 shown in any of FIGS. 1-5. Voice control module 115-*b* may include the rules mode module 505, rule generation module 510, and rule storage module 515 of voice control module 115-*a* described above with reference to FIG. 5. Voice control module 115-*b* may additionally include at least one of a command receipt module 605, a term identification module 610, a command confirmation module 615, and a rule confirmation module 620. The modules 605, 610, 615, 620 may perform at least some of the features and/or functionality of the rules mode module 505, rule generation module 510, and rule storage module 515 described above with reference to voice control module 115-*a*, and/or the voice control module 115 described with reference to FIGS. 1-4.

Command receipt module 605 may prompt a user for instructions relating to setting a rule for the home automation system. Command receipt module 605 may present the prompt in the form of, for example, an audible request (e.g., "state the rule"), a text message, a flashing light sequence, etc. Command receipt module 605 may operate to inform the user that the spoken command or other instruction from the user associated with setting a rule has been received. Command receipt module 605 may store, analyze, and/or evaluate the command or at least certain aspects of the command.

Term identification module 610 may operate to identify terms in the command received from the user. The term identification module 610 may identify certain of the terms as static terms and other of the terms as dynamic terms. In some examples, the command is provided at least in part by a menu selection or a written command. Regardless of the format of the command provided by the user, term identification module 610 may help identify key terms that are relevant for setting one or more rules. In at least one example, term identification module 610 may identify a trigger term used to initiate the rule setting mode, and may cooperate with rules mode module 505 related to initiating the rule setting mode. In other examples, term identification module 610 is operable to identify a different trigger word used to terminate a rule setting mode, to delete an existing rule, and/or to correct previously stated spoken commands.

Command confirmation module 615 may operate to provide confirmation back to the user that the user's command (whether spoken or in another format) has been received. Command confirmation module 615 may provide a responsive message to the user to confirm that the user's command is understood correctly. For example, command confirmation module 615 may provide a message to the user restating what the voice control module 115-*b* understood the user's command to say and/or mean (e.g., "you stated that the front door should be locked every time Bill arms the system. Is this correct?").

Rule confirmation module 620 may provide a response to the user that a rule has been generated and/or stored. For example, rule confirmation module 620 may provide a response to the user (e.g., spoken, text or otherwise) indicating that the rule has been recognized, saved, etc. Rule confirmation module 620 may provide an audible message to the user such as, for example, "the system will lock the door every time Bill arms the system," or "your requested rule has been set and saved." Voice control module 115 may cooperate with other devices such as, for example, remote device 310 to provide communication with the user. For example, any of the functions described with reference to the modules of voice control module 115-*b* may function at least in part in cooperation with remote device 310 or other features of the environments 100, 200, 300, 400 described above. Furthermore, any of the features and functionality of the voice control modules 115 (e.g., described with reference to FIGS. 5-6) may be included in the remote voice control module 430 described with reference to FIG. 4.

Figure 7:
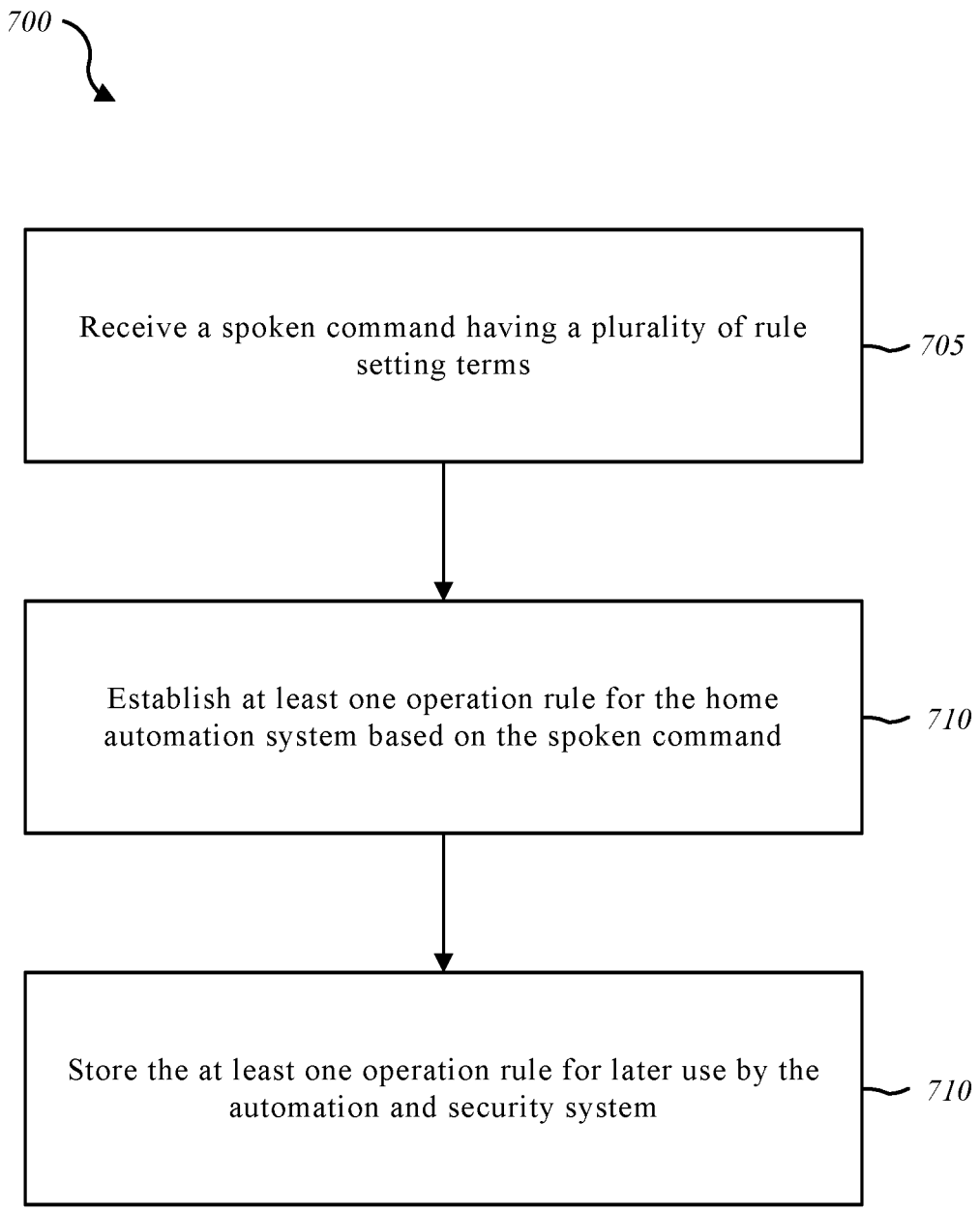
FIG. 7 is a flow diagram illustrating a method for establishing operation rules in a home automation system.

FIG. 7 is a flow diagram illustrating one embodiment of a method 700 for establishing operation rules in a home automation system. In some configurations, the method 700 may be implemented with any of the voice control modules 115 shown in FIGS. 1-6. In some examples, method 700 may be performed generally by device 105 or remote device 310 shown in FIGS. 1, 2, 3, and/or 4, or even more generally by the environments 100, 200, 300, 400 shown in FIGS. 1-4.

At block 705, method 700 includes receiving a spoken command having a plurality of rule setting terms. Block 710 includes establishing at least one operation rule for the home automation system based on the spoken command. At block 710, the method 700 includes storing the at least one operation rule for later use by the automation and security system.

Method 700 may also include initiating a rules mode for the home automation system prior to receiving a spoken command. Method 700 may include terminating the rules mode after establishing the at least one operation rule. Initiating the rules mode may include receiving a touch input at a control panel of the home automation system. Initiating the rules mode may include receiving a spoken trigger word or an audible sound. Method 700 may include delivering a request for clarification of a spoken command. The request for clarification may include an audible message. The request for clarification may include a displayed message visible on a control panel of the home automation system. Method 700 may include generating a message that includes a restatement of the spoken command and a request for confirmation of the correctness of the restatement of the spoken command. Method 700 may include generating a message to a user of the home automation system that includes a restatement of the at least one operation rule and requesting confirmation of the accuracy of the at least one operation rule.

Figure 8:
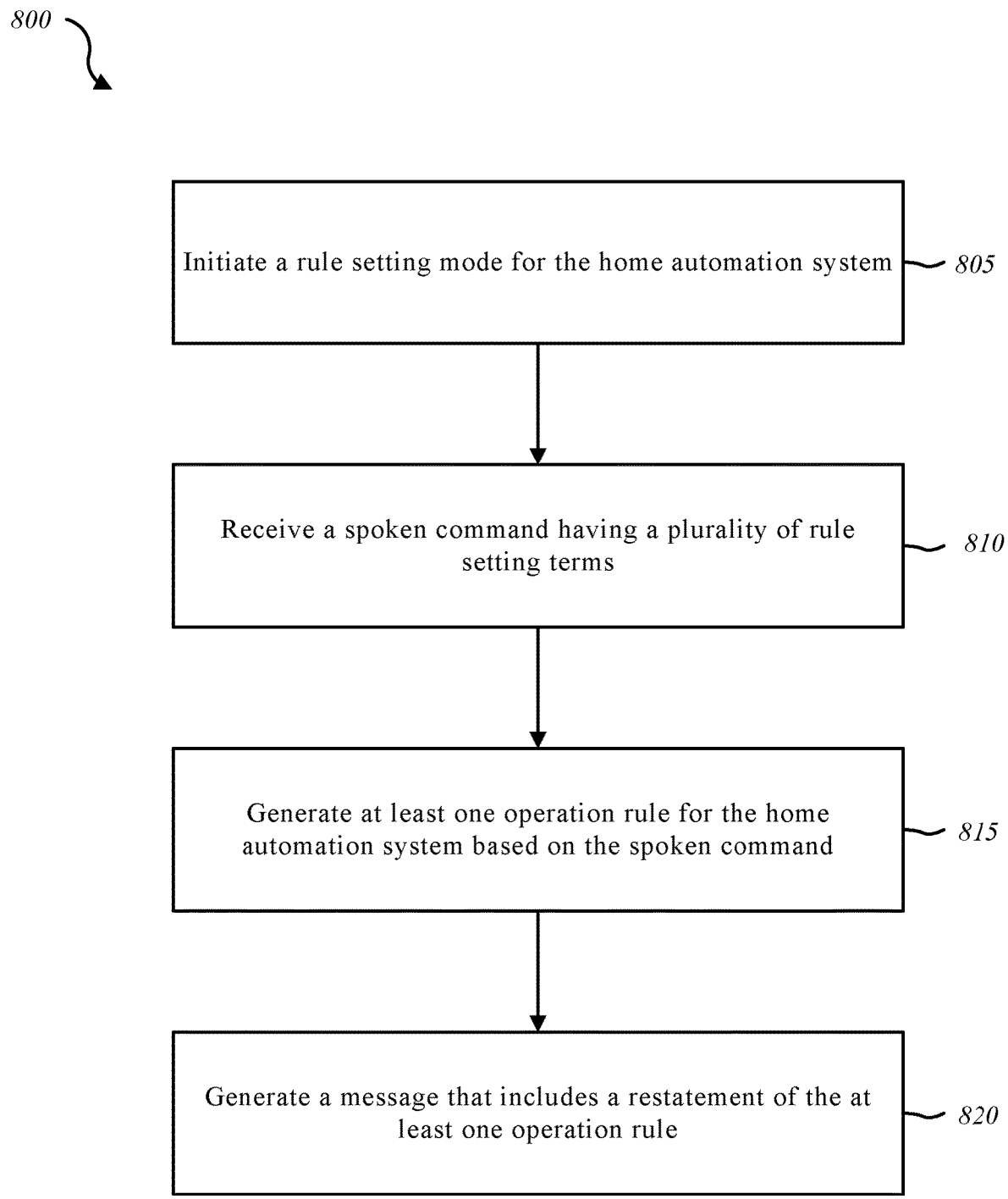
FIG. 8 is a flow diagram illustrating a method for establishing operation rules in a home automation system.

FIG. 8 is a flow diagram illustrating one embodiment of a method 800 for establishing operation rules in a home automation system. In some configurations, the method 800 may be implemented by any one of the voice control modules 115 described with reference to FIGS. 1-6. In other examples, method 800 may be performed generally by device 105 or the remote device 310 described with reference to FIGS. 1-4, or even more generally by the environments 100, 200, 300, 400 shown in FIGS. 1-4.

At block 805, method 800 includes initiating a rule setting mode for the home automation system. Block 810 includes receiving a spoken command having a plurality of rule setting terms. Block 815 includes generating at least one operation rule for the home automation system based on the spoken command. At block 820, method 800 includes generating a message that includes a restatement of the at least one operation rule.

Method 800 may also include defining at least some of the plurality of rule setting terms at the time of installing the home automation system at a property. At least some of the plurality of rule setting terms may be generic to a property of different home automation systems associated with a plurality of different properties. The plurality of rule setting terms may include at least one static term that is generic to a plurality of different home automation systems, and at least one dynamic term that is uniquely defined for the home automation system. Method 800 may include storing the at least one operation rule for later use by the home automation system, wherein storing the at least one operation rule includes storing in a local database of the home automation system. The method 800 may include generating a message requesting confirmation of the spoken command. Method 800 may include receiving confirmation of the spoken command.

Figure 9:
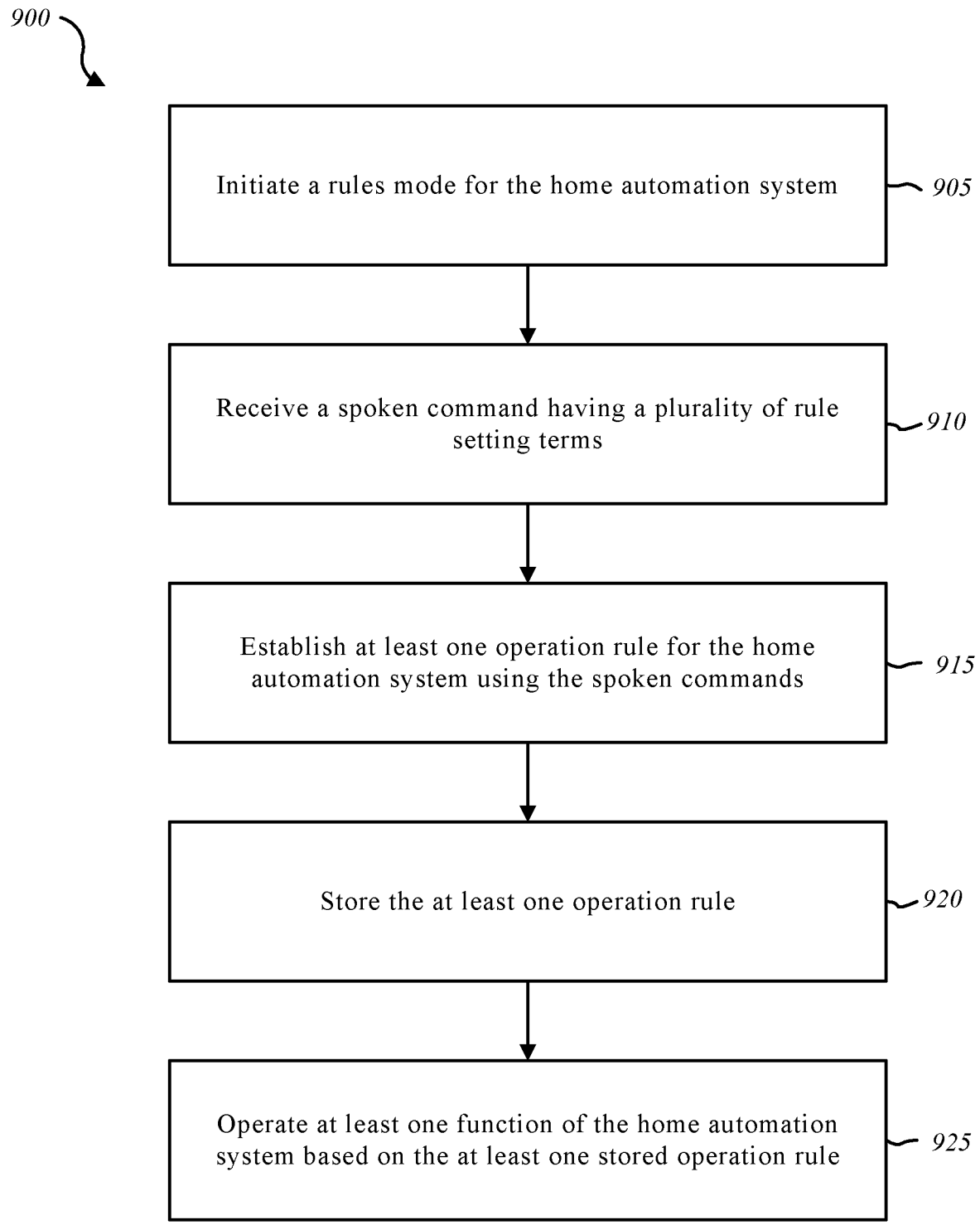
FIG. 9 is a flow diagram illustrating a method for establishing operation rules in a home automation system.

FIG. 9 is a flow diagram illustrating one embodiment of a method 900 for establishing operation rules in a home automation system. In some configurations, the method 900 may be implemented by the voice control module 115 described with reference to FIGS. 1-6. In other examples, method 900 may be performed generally by the device 105 or remote device 310 shown with reference to FIGS. 1-4, or even more generally by the environments 100, 200, 300, 400 shown in FIGS. 1-4.

At block 905, method 900 includes initiating a rules mode for the home automation system. Block 910 includes receiving a spoken command having a plurality of rule setting terms. At block 915, method 900 includes establishing at least one operation rule for the home automation system using the spoken commands. Block 920 includes storing the at least one operation rule. Block 925 includes operating at least one function of the home automation system based on the at least one stored operation rule.

The plurality of rule setting terms may include at least one static term that is preprogrammed into the home automation system prior to installation. The plurality of rule setting terms may include at least one dynamic term that is uniquely programmed into the home automation system no sooner than installation of the home automation system at a property.

Figure 10:
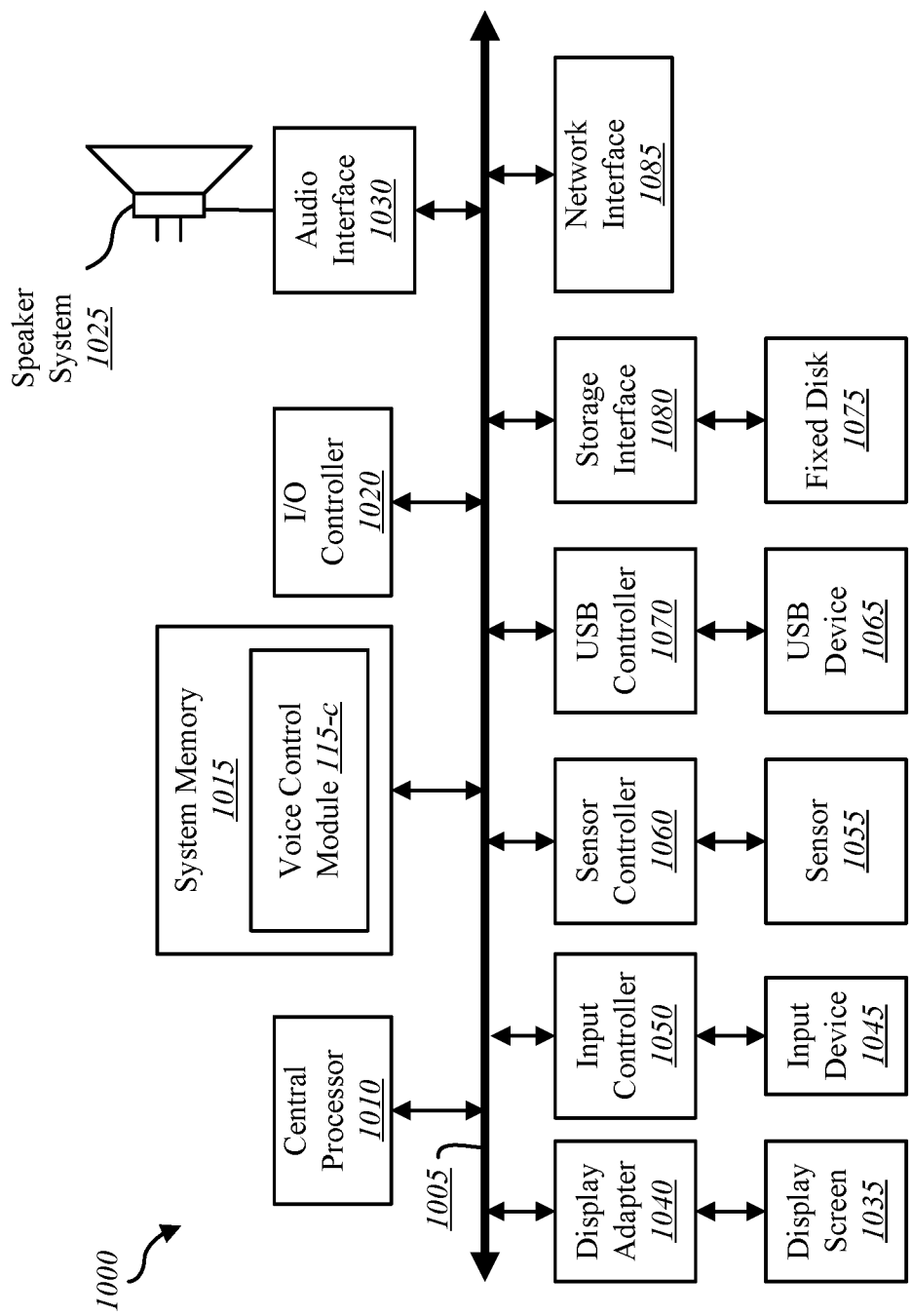
FIG. 10 is a block diagram of a computer system suitable for implementing the present systems and methods of FIGS. 1-9.

FIG. 10 depicts a block diagram of a controller 1000 suitable for implementing the present systems and methods. The controller 1000 may be an example of the device 105 or remote device 310 illustrated in FIGS. 1, 2, 3 and/or 4. In one configuration, controller 1000 includes a bus 1005 which interconnects major subsystems of controller 1000, such as a central processor 1010, a system memory 1015 (typically RAM, but which may also include ROM, flash RAM, or the like), an input/output controller 1020, an external audio device, such as a speaker system 1025 via an audio output interface 1030, an external device, such as a display screen 1035 via display adapter 1040, an input device 1045 (e.g., remote control device interfaced with an input controller 1050), multiple USB devices 1065 (interfaced with a USB controller 1070), and a storage interface 1080. Also included are at least one sensor 1055 connected to bus 1005 through a sensor controller 1060 and a network interface 1085 (coupled directly to bus 1005).

Bus 1005 allows data communication between central processor 1010 (e.g., processor 120) and system memory 1015, which may include read-only memory (ROM) or flash memory (neither shown), and random access memory (RAM) (not shown), as previously noted. Voice control module 115-*c*, which is one example of voice control module 115 shown in FIGS. 1-6, may be stored in system memory 1015. Any of the modules discloses with reference to FIGS. 1-6 may be stored in system memory 1015. The RAM is generally the main memory into which the operating system and application programs are loaded. The ROM or flash memory can contain, among other code, the Basic Input-Output system (BIOS) which controls basic hardware operation such as the interaction with peripheral components or devices. Applications (e.g., application 405) resident with controller 1000 are generally stored on and accessed via a non-transitory computer readable medium, such as a hard disk drive (e.g., fixed disk 1075) or other storage medium. Additionally, applications can be in the form of electronic signals modulated in accordance with the application and data communication technology when accessed via network interface 1085.

Storage interface 1080, as with the other storage interfaces of controller 1000, can connect to a standard computer readable medium for storage and/or retrieval of information, such as a fixed disk drive 1075. Fixed disk drive 1075 may be a part of controller 1000 or may be separate and accessed through other interface systems. Network interface 1085 may provide a direct connection to a remote server via a direct network link to the Internet via a POP (point of presence). Network interface 1085 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1000 wirelessly via network interface 1085.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 10 need not be present to practice the present systems and methods. The devices and subsystems can be interconnected in different ways from that shown in FIG. 10. The aspect of some operations of a system such as that shown in FIG. 10 are readily known in the art and are not discussed in detail in this application. Code to implement the present disclosure can be stored in a non-transitory computer-readable medium such as one or more of system memory 1015 or fixed disk 1075. The operating system provided on controller 1000 may be iOS®, ANDROID®, MS-dOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. An apparatus for establishing operation rules in a home automation system, comprising:
 a processor;
 a memory in electronic communication with the processor; and
 instructions stored in the memory, the instructions being executable by the processor to:
 receive a spoken command having a plurality of rule setting terms;
 identify at least a portion of the spoken command that is unrecognizable by the home automation system based at least in part on receiving the spoken command;

generate a request for clarification of at least the portion of the spoken command that is unrecognizable by the home automation system;
deliver the request for a clarification of at least the portion of the spoken command that is unrecognizable by the home automation system;
receive the clarification of at least the portion of the spoken command that is unrecognizable by the home automation system based at least in part on delivering the request for the clarification of at least the portion of the spoken command that is unrecognizable by the home automation system;
establish at least one operation rule for the home automation system based on the spoken command and the clarification of the spoken command; and
store the at least one operation rule for later use by the home automation system.

2. The apparatus of claim 1, wherein the instructions are executable by the processor to:
initiate a rules mode for the home automation system prior to receiving the spoken command.

3. The apparatus of claim 2, wherein the instructions are executable by the processor to:
terminate the rules mode after establishing the at least one operation rule.

4. The apparatus of claim 2, wherein the initiating the rules mode includes receiving a touch input at a control panel of the home automation system.

5. The apparatus of claim 2, wherein the initiating the rules mode includes receiving a spoken trigger word or an audible sound.

6. The apparatus of claim 1, wherein the instructions are executable by the processor to:
identify one or more unknown terms in the spoken command, wherein delivering a request for clarification of the spoken command is based at least in part on the identifying.

7. The apparatus of claim 6, wherein the request for clarification includes an audible message.

8. The apparatus of claim 6, wherein the request for clarification includes a displayed message visible on a control panel of the home automation system.

9. The apparatus of claim 1, wherein the instructions are executable by the processor to:
generate a message that includes a restatement of the spoken command and a request for confirmation of the correctness of the restatement of the spoken command.

10. The apparatus of claim 1, wherein the instructions are executable by the processor to:
generate a message to a user of the home automation system that includes a restatement of the at least one operation rule and requests confirmation of the accuracy of the at least one operation rule.

11. A computer-program product for establishing operation rules in a home automation system, the computer-program product comprising a non-transitory computer-readable medium storing instructions executable by a processor to:
initiate a rule setting mode for the home automation system;
receive a spoken command having a plurality of rule setting terms;
identify at least a portion of the spoken command that is unrecognizable by the home automation system based at least in part on receiving the spoken command;
generate a message requesting a confirmation of at least the portion of the spoken command that is unrecognizable by the home automation;
deliver the message requesting confirmation of at least the portion of the spoken command that is unrecognizable by the home automation system;
receive a response message confirming the spoken command that was unrecognizable by the home automation system based at least in part on delivering the message requesting confirmation of at least the portion of the spoken command that is unrecognizable by the home automation system;
generate at least one operation rule for the home automation system based on the spoken command and the confirmation of the spoken command; and
generate a message that includes a restatement of the at least one operation rule.

12. The computer-program product of claim 11, wherein at least some of the plurality of rule setting terms are defined during installation of the home automation system at a property.

13. The computer-program product of claim 11, wherein at least some of the plurality of rule setting terms are generic to a plurality of different home automation systems associated with a plurality of different properties.

14. The computer-program product of claim 11, wherein the plurality of rule setting terms include at least one static term that is generic to a plurality of different home automation systems, and at least one dynamic term that is uniquely defined for the home automation system.

15. The computer-program product of claim 11, wherein the instructions are executable by the processor to:
store the at least one operation rule for later use by the home automation system, wherein storing the at least one operation rule includes storing in a local database of the home automation system.

16. The computer-program product of claim 11, wherein the instructions are executable by the processor to:
identify one or more unknown terms in the spoken command, wherein generating the message requesting confirmation of the spoken command is based at least in part on the identifying.

17. The computer-program product of claim 16, wherein the instructions are executable by the processor to:
receive confirmation of the spoken command.

18. A computer-implemented method for establishing operation rules in a home automation system, comprising:
initiating a rules mode for the home automation system;
receiving a spoken command having a plurality of rule setting terms;
identifying at least a portion of the spoken command that is unrecognizable by the home automation system based at least in part on receiving the spoken command;
generating a request for clarification of at least the portion of the spoken command that is unrecognizable by the home automation system;
delivering the request for a clarification of at least the portion of the spoken command that is unrecognizable by the home automation system;
receiving the clarification of at least the portion of the spoken command that is unrecognizable by the home automation system based at least in part on delivering the request for the clarification of at least the portion of the spoken command that is unrecognizable by the home automation system;

establishing at least one operation rule for the home automation system using the spoken command and the clarification of the spoken command;

storing the at least one operation rule; and operating at least one function of the home automation system based on the at least one stored operation rule.

19. The method of claim 18, wherein the plurality of rule setting terms include at least one static term that is pre-programmed into the home automation system prior to installation.

20. The method of claim 18, wherein the plurality of rule setting terms include at least one dynamic term that is uniquely programmed into the home automation system no sooner than installation at a property.

* * * * *